(12) United States Patent
Johnson et al.

(10) Patent No.: US 11,908,636 B2
(45) Date of Patent: Feb. 20, 2024

(54) GAS DIFFUSION LAYER, METHOD FOR MAKING THE SAME AND PHOTOELECTRODE

(71) Applicant: TOYOTA JIDOSHA KABUSHIKI KAISHA, Toyota (JP)

(72) Inventors: Hannah Johnson, Brussels (BE); Sachin Kinge, Brussels (BE); Marina Caretti, Vaud (CH); Jun-Ho Yum, Vaud (CH); Kevin Sivula, Vaud (CH); Elizaveta Mensi, Vaud (CH)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/080,166

(22) Filed: Dec. 13, 2022

(65) Prior Publication Data
US 2023/0197357 A1    Jun. 22, 2023

(30) Foreign Application Priority Data
Dec. 21, 2021   (EP) ..................... 21306880

(51) Int. Cl.
*H01G 9/20* (2006.01)
*H01G 9/00* (2006.01)
*H01G 9/042* (2006.01)

(52) U.S. Cl.
CPC ............. *H01G 9/20* (2013.01); *H01G 9/0029* (2013.01); *H01G 9/042* (2013.01)

(58) Field of Classification Search
CPC ....................................................... H01G 9/20
See application file for complete search history.

(56) References Cited

U.S. PATENT DOCUMENTS

| | | | | |
|---|---|---|---|---|
| 2016/0351343 | A1* | 12/2016 | Lindström | H01G 9/2022 |
| 2020/0402726 | A1* | 12/2020 | Lindström | H01G 9/2031 |
| 2021/0142956 | A1* | 5/2021 | Lindström | H01L 31/05 |

OTHER PUBLICATIONS

Itoh et al., "Stacked thin-film photoelectrode using iron oxide", Journal of Applied Physics, vol. 56, No. 874, Mar. 8, 1984.
Ahmet et al., "Demonstration of a 50 cm$^2$ BiVO4 tandem photoelectrochemical-photovoltaic water splitting device", Sustainable Energy and Fuels, vol. 3, 2019, pp. 2366-2379.

* cited by examiner

*Primary Examiner* — Daniel P Malley, Jr.
(74) *Attorney, Agent, or Firm* — Oliff PLC

(57) ABSTRACT

Method for making a gas diffusion layer for an electrode, the method including processing quartz wool with water in a blender to form a suspension, filtering the suspension to remove water and contaminants, to form a cake of entangled quartz fibres, annealing the cake of entangled quartz fibres without complete melting of the fibres to obtain a porous quartz felt having pore size greater than 1 μm and coating the porous quartz felt with a conductive material. Gas diffusion layer for an electrode and photoelectrode including the gas diffusion layer.

14 Claims, 7 Drawing Sheets

GAS DIFFUSION LAYER, METHOD FOR MAKING THE SAME AND PHOTOELECTRODE

CROSS-REFERENCE TO RELATED APPLICATION

This application claims priority to European Patent Application No. 21 306 880.2 filed on Dec. 21, 2021, incorporated herein by reference in its entirety.

BACKGROUND

1. Technical Field

The present disclosure is related to a gas diffusion layer for an electrode, a method for making the same, and a photoelectrode.

2. Description of Related Art

Gas diffusion layers (GDLs) are porous substrates which are electrically conductive and have sufficient pore sizes to not restrict gas flow through the support (>1 micrometer). GDLs are typically used in electrochemical (e.g. fuel cell or electrolysis) applications where the reactant and/or product is a gaseous species to reduce mass transport limitations (gas flow and ionic resistance), especially upon scale up.

GDLs are typically carbon-based or metallic (e.g. Ti) porous supports, which are intrinsically non-transparent. However, there is an increasing interest in photo-electro-chemical (light activated) applications where the non-transparent nature of the GDL is limiting. For example, it prevents configurations where two photoelectrodes are placed one in front of the other, in a so-called tandem configuration, since the light cannot reach the back electrode.

Therefore, in experimental examples of tandem set-ups, the front photoelectrode material must be coated on a conductive monolithic (solid, flat) substrate such as fluorine-doped or indium-doped tin oxide coated glass, However, as described above, this causes mass transport limitations resulting in a loss of efficiency upon scale-up (I. Y. Ahmet et al. Sustainable Energy and Fuels, 2019, 3, 2366).

Another disadvantage of monolithic substrates compared with GDLs, is the lack of material surface area. When carriers (electrons and holes) are generated in photo-absorbing materials, they have a limited diffusion length, which is the average length travelled before the electrons and holes recombine. The thickness of the film (the distance between the thickest part of the photo-absorbing material and the charge collector—the conducting substrate—either GDL or monolithic) must be less than the diffusion length to prevent loss of performance due to charge recombination. For materials with a low light absorption coefficient and low diffusion length, this means multiple layers of the material must be deposited onto individual monolithic substrates absorb the maximum amount of light, as experimentally demonstrated by K. Itoh et al., 1 Applied Phys., 2019 56, 874. However, this quickly becomes impractical when multiple layers are required—particularly when considering a scaled device. In contrast, for a GDL, there are intrinsically many layers of conducting material lying so deposition throughout the substrate can result in a layered effect.

Another general issue for electrolysis is GDL stability at high oxidative conditions. In order to overcome this issue, Au-coated or Pt-coated porous titanium is used but this is very expensive.

The cost of the gas diffusion layer/porous transparent layer is around 20% of the overall electrolyser stack cost and 50% of that cost comes from the use of precious metals (Au or Pt). The gas diffusion layer described in this disclosure is made of abundant materials This project has received funding from the European Union's Horizon 2020 research and innovation programme under grant agreement 883264.

SUMMARY

Therefore, according to embodiments of the present disclosure, a method for making a gas diffusion layer for an electrode is provided. The method includes:
  processing quartz wool with water in a blender to form a suspension;
  filtering the suspension to remove water and contaminants, to form a cake of entangled quartz fibres;
  annealing the cake of the entangled quartz fibres without complete melting of the entangled quartz fibres to obtain a porous quartz felt having pore size greater than 1 µm;
  coating the porous quartz felt with a conductive material.

By providing such a configuration, a gas diffusion layer having high surface area and good resistivity compared to commercial gas diffusion layer is obtained.

According to some embodiments, the conductive material may be transparent.

Non-limiting examples of transparent conductive material may be transparent oxide, such as $CuCrO_2$, silver nanowires.

According to some embodiments, the conductive material may be based on tin oxide or zinc oxide or a mixture thereof.

Thanks to the conductive material being based on tin oxide or zinc oxide or a mixture thereof, it is possible to obtain a gas diffusion layer having a good oxidation stability, i.e., low corrosion current under oxidative conditions.

Non-limiting examples of conductive materials may be zinc oxide, fluorine-doped tin oxide, indium tin oxide, aluminium zinc oxide, indium tin zinc oxide, indium gallium zinc oxide, zinc tin oxide, indium zinc oxide, indium tin zirconium oxide. These conductive materials may also be transparent.

According to some embodiments, the porous quartz felt may have a transmittance equal to or greater than 30%, equal to or greater than 40%, or equal to or greater than 50%, at wavelength between 400 and 800 nm, and the conductive material is a transparent conductive material.

The transmittance allows for the light to pass through a first light absorber to a second light absorber, the glass diffusion layer being disposed between the first light absorber and the second light absorber.

As a non-limiting example, the first light absorber and/or the second light absorber may be deposited on the gas diffusion layer.

According to some embodiments, the cake of entangled quartz fibres may be pressed before annealing.

This step allows for uniform thickness of the porous quartz felt.

According to some embodiments, the porous quartz felt may have a reflectance equal to or greater than 20%, at wavelength between 400 and 800 nm and for a resistivity equal to or less than 100 Ω/sq, equal to or less than 50 Ω/sq, or equal to or less than 30 Ω/sq.

The reflectance allows the light to be reflected back to the first absorber, helping to improve the light collected on the first absorber.

According to some embodiments, the quartz wool may have a fibre diameter equal to or greater than 1 μm and equal to or smaller than 15 μm, equal to or smaller than 10 μm, or equal to or smaller than 5 μm.

According to some embodiments, an annealing plateau is between 1250° C. and 1350° C. and an annealing plateau time may be between 5 minutes and 3 hours, or 1 hour and 3 hours.

According to some embodiments, the entangled quartz fibres may have an average length equal to or greater than 50 microns and equal to or smaller than 5 millimetres, or equal to or greater than 200 microns and equal to or smaller than 3 millimetres.

According to some embodiments, the porosity of the porous quartz felt may be equal to or greater than 10%, equal to or greater than 30% and equal to or smaller than 90%, or equal to or smaller than 80%.

The porosity P may be measured based on Archimedes' principle by measuring the mass of the specimen in air ($W_{air}$) and in water ($W_{water}$) and using the following equations (1) and (2), wherein $\rho_{water}$ is the density of water.

$$P = \frac{V_{apparent}}{V_{total}} \times 100(\%) \quad (1)$$

$$V_{apparent} = \frac{W_{air} - W_{water}}{\rho_{water}} \quad (2)$$

According to other embodiments of the present disclosure, a gas diffusion layer for an electrode is provided. The gas diffusion layer for an electrode includes partially melted entangled quartz fibres having pore size greater than 1 μm coated with a conductive material.

According to some embodiments, the gas diffusion layer may have a transmittance equal to or greater than 15%, equal to or greater than 20%, or equal to or greater than 35%, at wavelength between 400 nm and 800 nm.

According to some embodiments, the gas diffusion layer may have a sheet resistance equal to or smaller than 40 Ω/sq, equal to or smaller than 30 Ω/sq, or equal to or smaller than 20 Ω/sq.

According to some embodiments, the porosity of the gas diffusion layer may be equal to or greater than 10%, equal to or greater than 30% and equal to or smaller than 90%, or equal to or smaller than 80%.

According to some embodiments, the conductive material may be based on tin oxide, fluorine-doped tin oxide or zinc oxide or a mixture thereof, or silver nanowires.

The use of fluorine-doped tin oxide allows for a good oxidative stability. Good oxidative stability means a steady corrosion current smaller than 2 μAm$^{-2}$ measured at 1.8 eV in 0.5 M $H_2SO_4$.

According to other embodiments of the present disclosure, a photoelectrode is provided. The photoelectrode includes an above-defined gas diffusion layer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
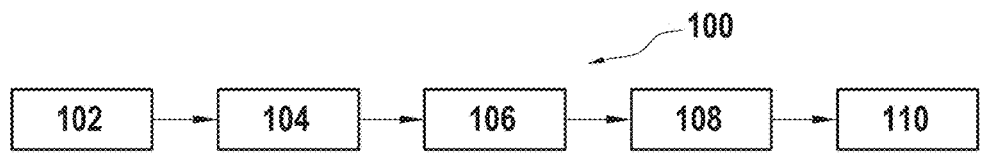
FIG. 1 shows a flow chart of the method according to embodiments of the present disclosure.

FIG. 1 shows a flow chart of a method 100 for making a gas diffusion layer for an electrode.

The method 100 includes a step of processing 102 quartz wool with water in a blender to form a suspension.

As non-limiting example, quartz wool with a fibre diameter between 1 to 15 μm (micrometre) is suitable. Fibre diameter between 1 to 5 μm is also suitable.

For example, the blender may be a PHILIPS Viva Collection HR3556/02 (900 W).

Sample 1: 10 mg of quartz wool have been dispersed in 20 mL (millilitre) of distilled water and blended for 30 s (second).

Sample 2: 10 mg of quartz wool have been dispersed in 20 mL of distilled water and blended for 600 s.

Sample 1 and Sample 2 were then drop-casted onto a glass slide. The fibres length has been measured using a Nikon Eclipse LV100ND optical microscope, objective ×5, and are as follow:

Sample 1: fibre length=256±176 μm.

Sample 2: fibre length=122±94 μm.

The method 100 includes a step of filtering 104 the suspension to remove water and contaminants, to form a cake of entangled quartz fibres. The filtering step 104 also allows compacting of the fibres and forming an entangled fibres cake.

Figure 2:
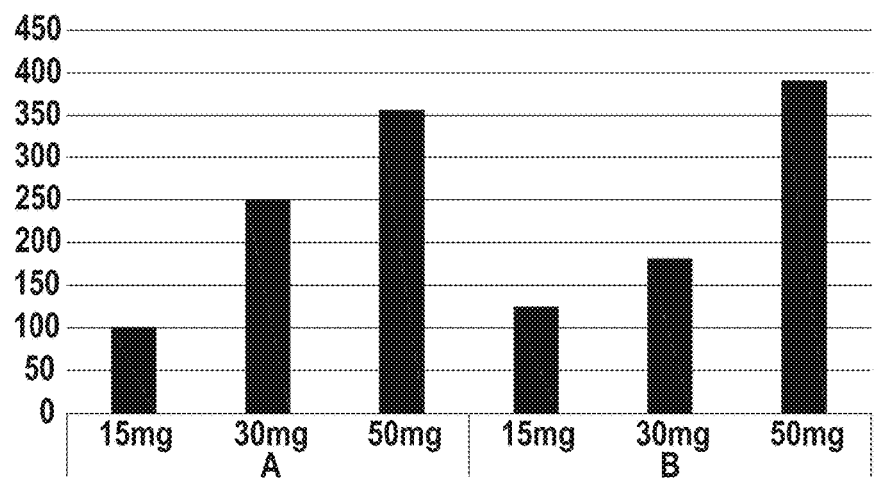
FIG. 2 shows the evolution of thickness of the cake as function of the quartz fibre content and the blending time.

The filtering step 104 the suspension is made by passing the suspension through a porous filter made of cellulose (0.45 μm), contaminants and particles smaller than 0.45 μm are removed, FIG. 2 shows the influence of the content of quartz wool on the density of the cake. FIG. 2 shows samples at 15, 30 and 50 mg of quartz wool dispersed in 35 mL of distilled water and blended for 10 seconds (A) and 30 seconds (B). The Y axis corresponds to thickness (in μm) of the porous quartz felt obtained after filtering.

The method 100 includes a step of annealing 108 the cake of entangled quartz fibres without complete melting of the fibres to obtain a porous quartz felt having pore size greater than 1 μm.

Figure 3:
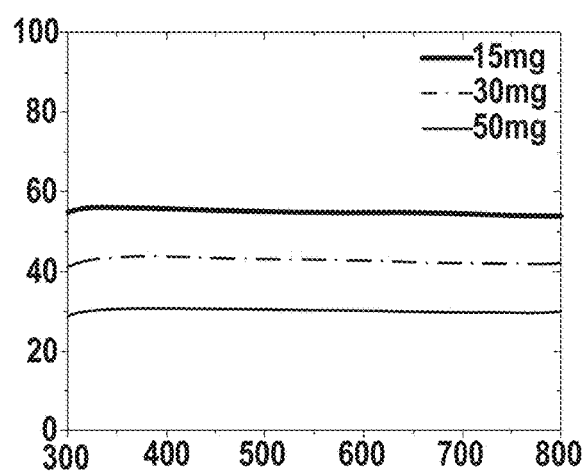
FIGS. 3 and 4 respectively show the transmittance and the reflectance of porous quartz felts as a function of fibre content for a blending time of 30 s and a given annealing step.
Figure 4:
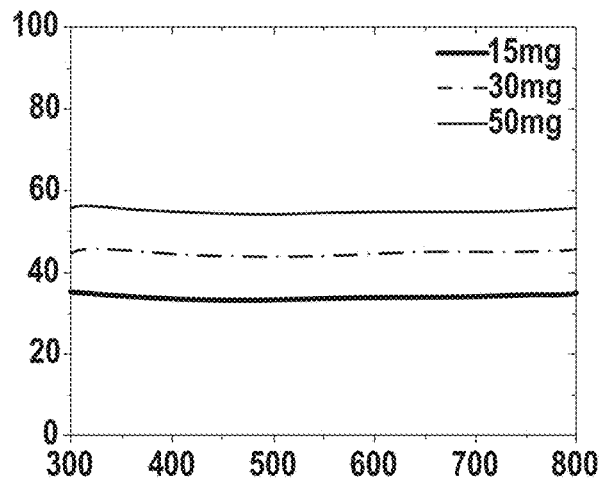
Figure 5:
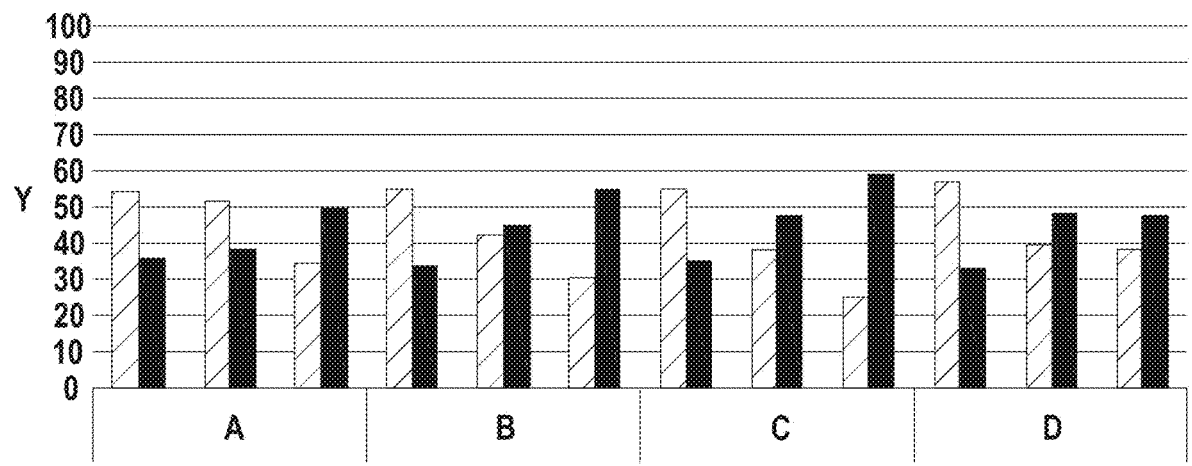
FIG. 5 shows the transmittance and the reflectance of porous quartz felts as a function of fibre content for various blending time and a given annealing step.

Measurement of transmittance and reflectance have been carried out on the porous quartz felt obtained after annealing the samples blended for 30 s and are reported in FIGS. 3 and 4, wherein the X axis is the wavelength (in is nm) and the Y axis is the transmittance (in %) and the reflectance (in %), respectively, FIG. 5 gives values of both transmittance (hatched) and reflectance (black) for 10 s (A), 30 s (B), 60 s (C) and 600 s (D) for annealing plateau temperature at 1350° C. (Celsius) for 2 h (hour).

Transmittance and reflectance are measure with UV-vis with integrating sphere.

Transmittance and reflectance are both beneficial, transmittance being favoured over reflectance.

Figure 6:
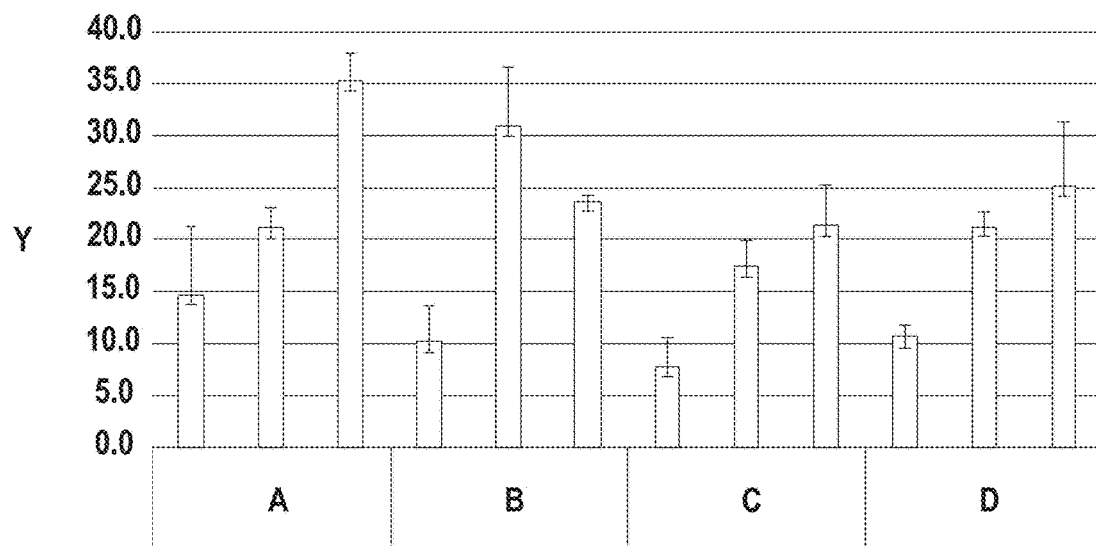
FIG. 6 shows the sheet resistance of the porous quartz felt obtained after annealing the samples for various blending time and given annealing step.

FIG. 6 gives values of the sheet resistance of the porous quartz felt (in Ω/sq Y axis) obtained after annealing the samples blended for 10 s (A), 30 s (B), 60 s (C) and 600 s (D) and annealed at 1350° C. for 2 h. The sheet resistance is measure with a four point probe. Commercial fluorine-doped tin oxide exhibits values around 13 Ω/sq.

The method 100 includes a step of coating 110 the porous quartz felt with a conductive material so as to obtain a gas diffusion layer.

Figure 7:
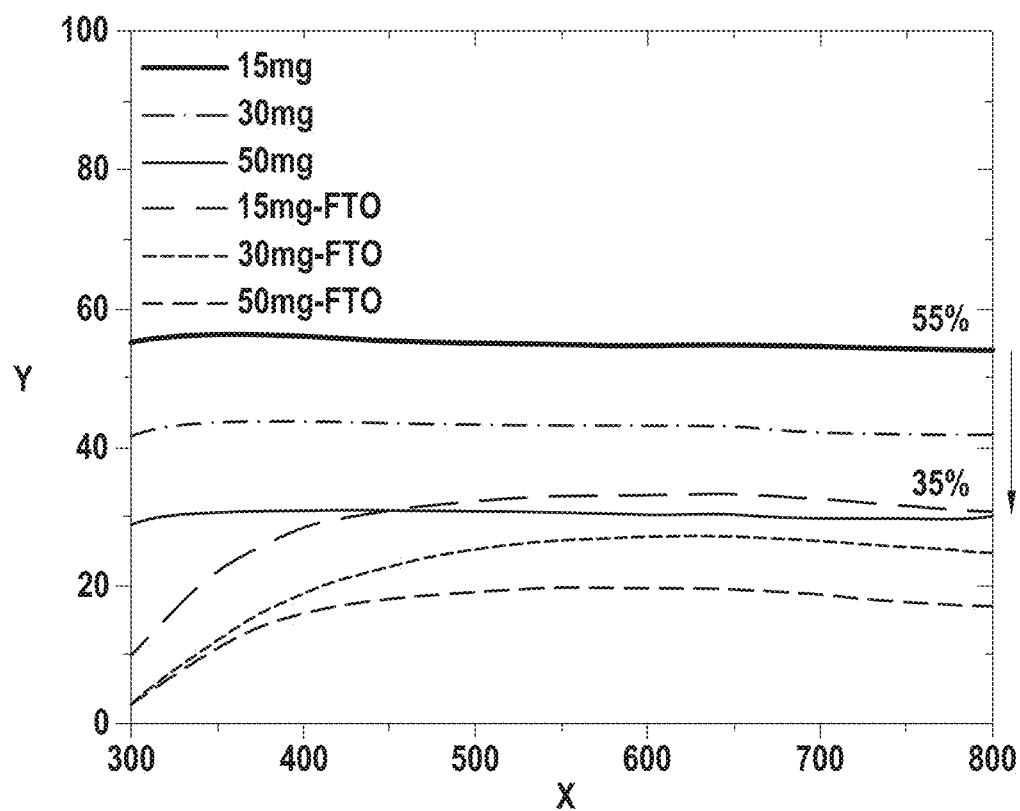
FIG. 7 shows a comparison of the transmittance before and after coating.

FIG. 7 shows the change in transmittance (in %-Y axis) as a function of wavelength (in nm) after coating the samples of FIG. 3 with a fluorine doped tin oxide deposited by Chemical Vapor Deposition so as to obtain a transparent gas diffusion layer. The coating is homogeneous and has a thickness of 100 nm.

The transparent gas diffusion layer is suitable as a support for photo-absorbing materials.

Figure 8:
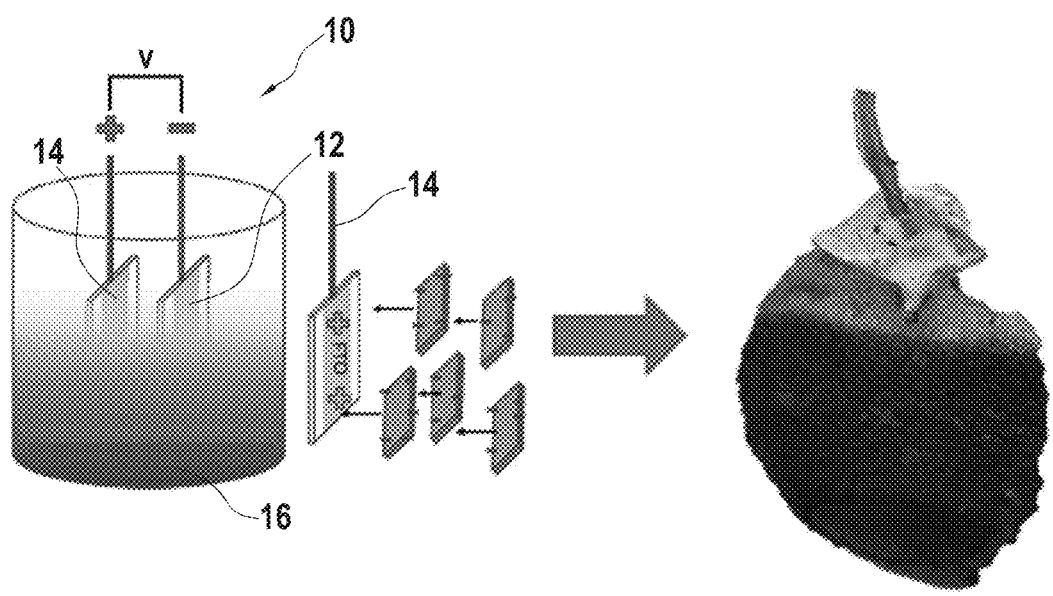
FIG. 8 shows a set-up for depositing $WSe_2$ on the gas diffusion layer.

The transparent gas diffusion layer of Sample 1 was coated in the device 10 as shown on FIG. 8 with tungsten selenide nanoflakes under the following conditions:

Working electrode 14 (cathode): transparent gas diffusion layer.

Counter electrode 10 (anode): fluorine tin oxide-coated monolithic glass (no deposition observed).

Electrolyte: $WSe_2$ exfoliated flakes in N-Methyl-2-pyrrolidone is (NMP).

Potential: 10 V applied for 1 hr.

The set-up is illustrated in FIG. 8 where both electrodes are immersed in a vessel 16 containing the electrolyte.

Figure 9:
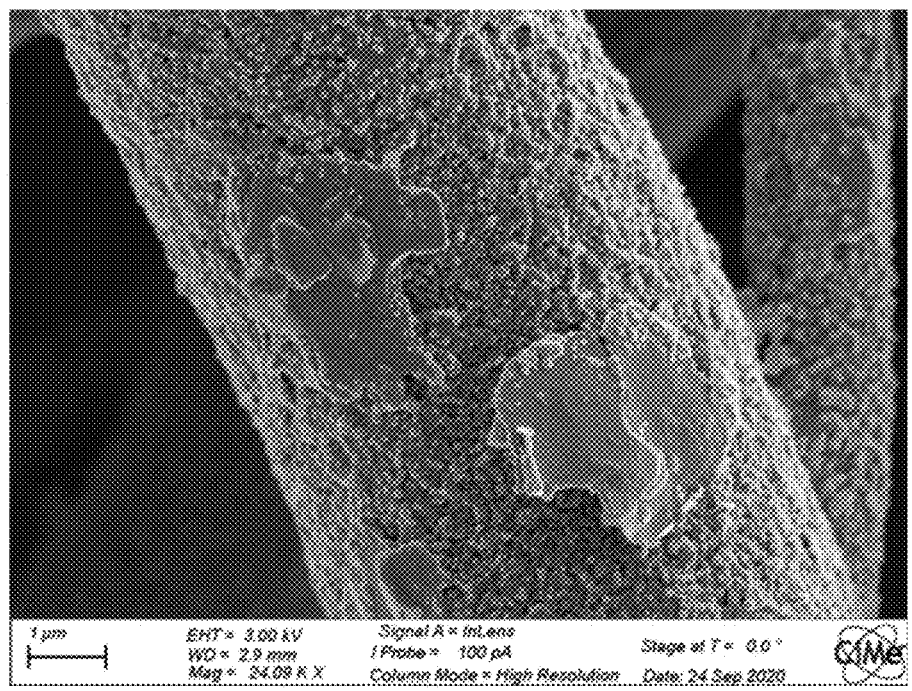
FIG. 9 shows a scanning electron microscope image of photo-absorber and Pt coated on the transparent gas diffusion layer.

FIG. 9 shows a scanning electron microscope image of the nanoflakes of $WSe_2$ photo-absorber on the transparent gas diffusion layer.

Pt catalyst has been deposited by photoelectrodeposition.

Working electrode: transparent gas diffusion layer coated with $WSe_2$ and Pt coating.

Counter electrode: Pt wire

Reference electrode: Ag/AgCl

Electrolyte: 1 mM $H_2PtCl_6$ at pH 0.5

Charge: 14mC

Figure 10:
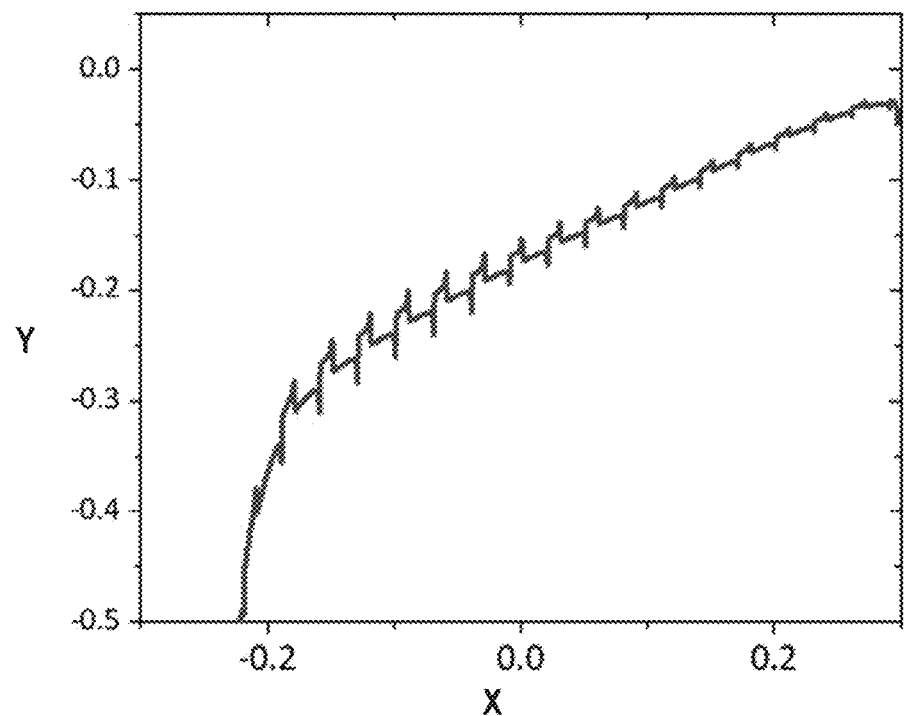
FIG. 10 shows the photochemical performance of the photo-absorber and Pt coated transparent gas diffusion layer.

The photochemical properties of the transparent gas diffusion layer coated with $WSe_2$ and Pt were measured under the following conditions: 1M $H_2SO_4$; 1 Sun, Peek cell, reference electrode: Pt. The results are shown in FIG. 10, Y axis being the current density expressed in $mA.cm^{-2}$ and X axis being the potential expressed in V vs Ag/AgCl. By scanning the voltage, a current can be measured, which confirms the conductivity of the electrode. Moreover, a periodic light illumination (2 seconds light on/1 second light off) leads to a periodic change of current: the current increases when the sample is illuminated. This confirms that the gas diffusion layer with the photoabsorber and the platinum catalyst responds to a light illumination and may be used as a photoelectrode.

Figure 11:
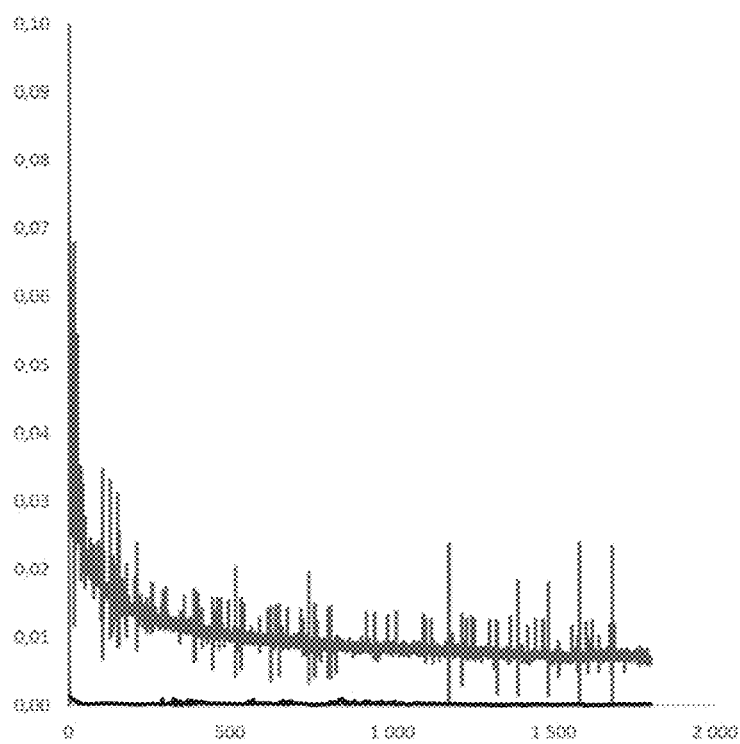
FIG. 11 shows the density of current as a function of time for different gas diffusion layers.

FIG. 11 shows a measure of the current density (in $mA/cm^2$) as a function of time (in seconds) for different gas diffusion layer. As can been seen, when a voltage of 1.8 V (Volt) is applied, the gas diffusion layer shows 0 current density, whereas a titanium mesh shows a current density up to 0.01 $mA/cm^2$ (milliampere per square centimetre). Although small, the current density shows a potential degradation due to oxidation of the titanium mesh. As can be seen, the gas diffusion layer does not exhibit such current density and is therefore stable in regard to the oxidation.

Silver nanowires coated quartz felt have also been tested.

The porous quartz felt is the same as Sample 1. The porous quartz felt was suspended 1 cm over a hotplate heated to 80° C. 100 μL of a 120-150 nm silver nanowire solution (0.5 mg/mL, Sigma Aldrich) was deposited onto the felt in 10 μL aliquots by drop-casting and allowed to dry.

Figure 12:
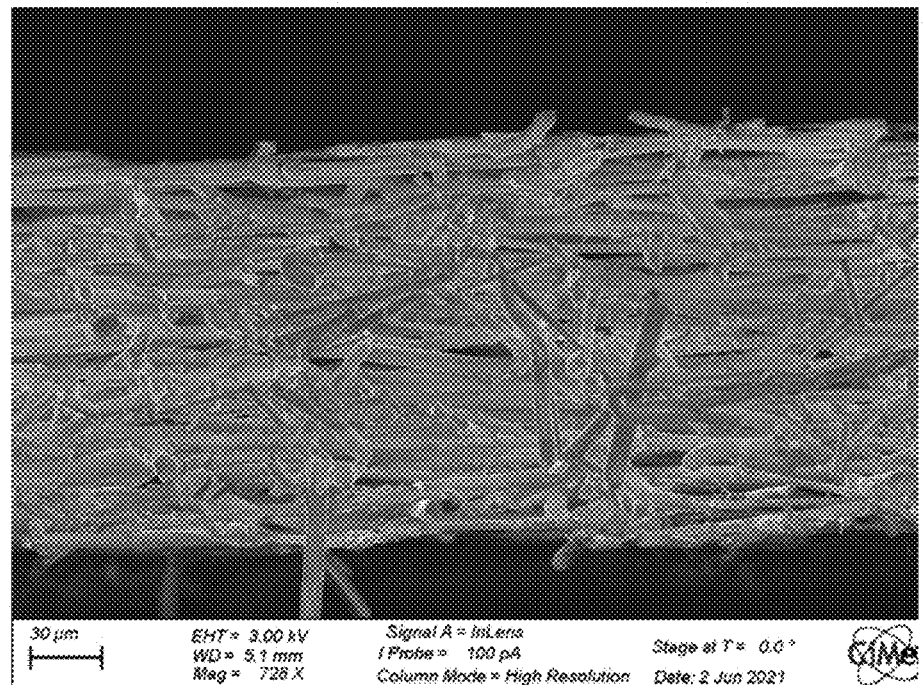
FIG. 12 shows scanning electron microscope images of a porous quartz felt coated with silver nanowires.
Figure 13:
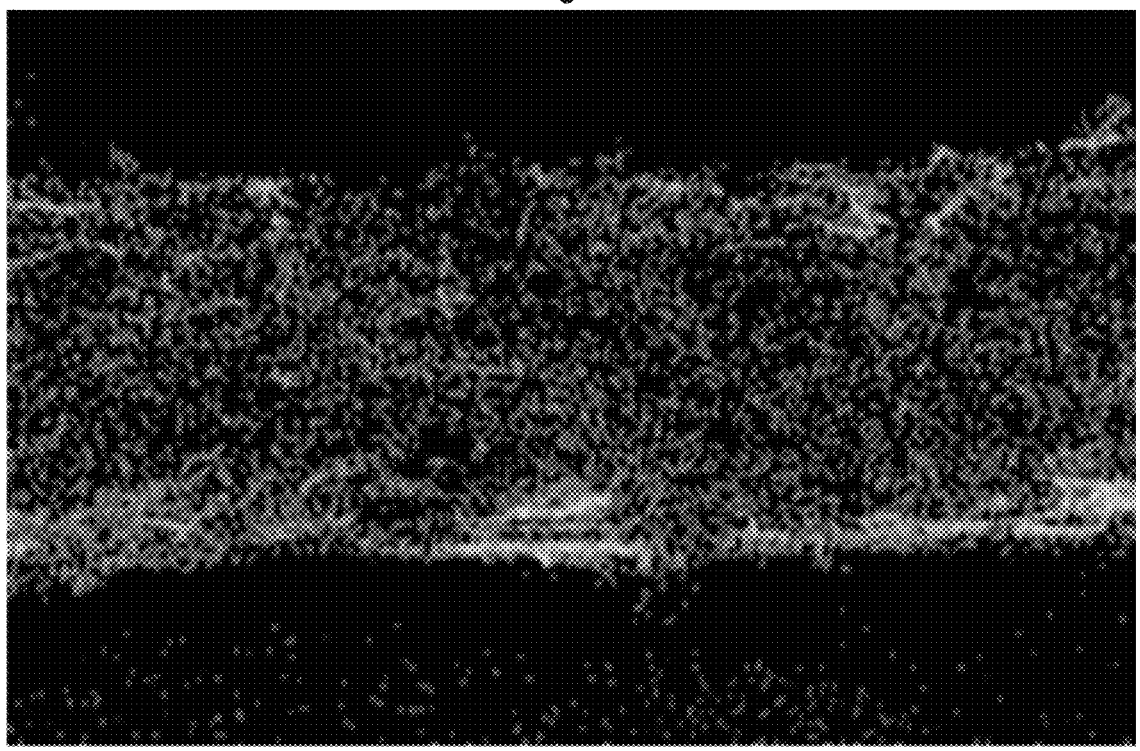
FIG. 13 shows a EDX scanning electron microscope image of the porous quartz felt showing the repartition of silver on the porous quartz felt.
Figure 14:
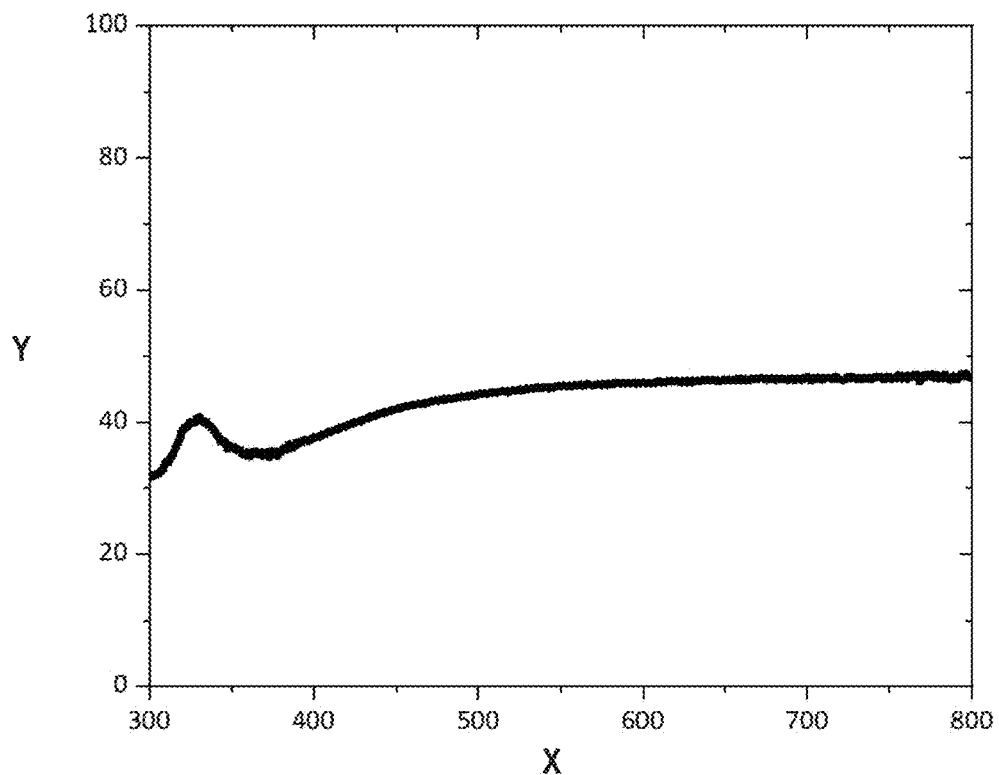
FIGS. 14 and 15 respectively show the transmittance and the reflectance of porous quartz felts coated with silver nanowires.
Figure 15:
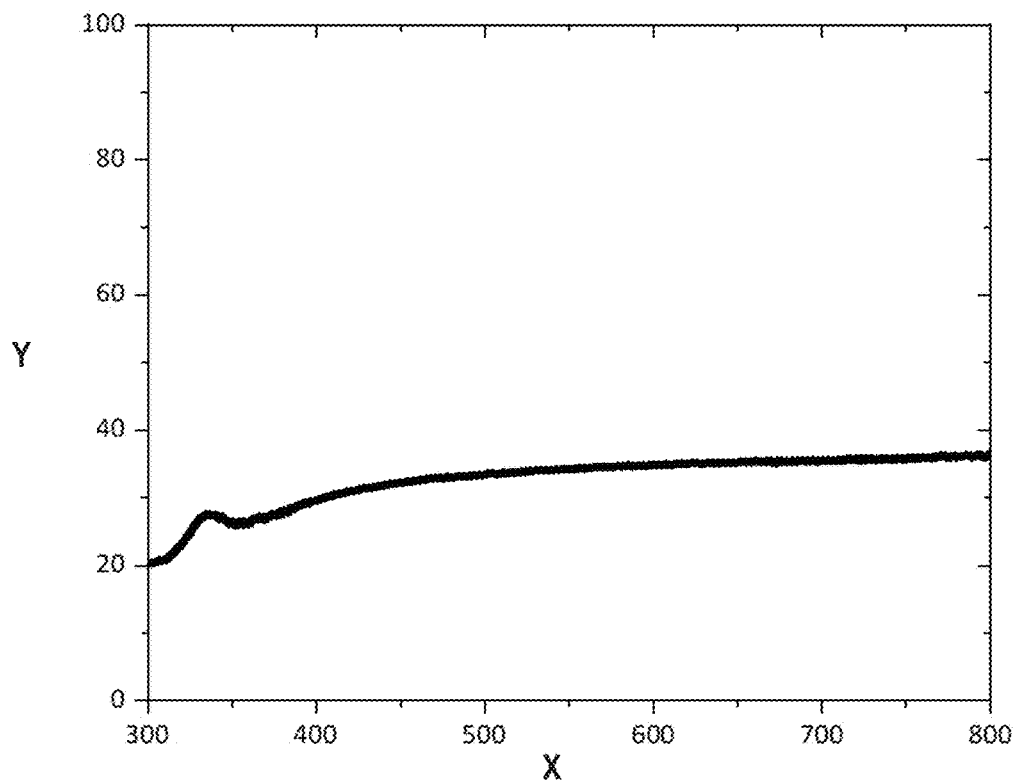

FIGS. 12 and 13 show pictures taken of the porous quartz felt coated with silver nanowires with a scanning electron microscope, the FIG. 13 showing the distribution of the silver nanowires on the porous quartz felt.

The sheet resistance was measured to be 20-50 Ω/sq.

FIG. 13 (X axis being wavelength in nm and Y axis being the transmittance in %) and 14 (X axis being wavelength in nm and Y axis being the reflectance in %) show respectively that the average transmittance of the coated porous quartz felt is around 43.3% and the average reflectance is around 32.6%.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the is present disclosure.

It is intended that the specification and examples be considered as exemplary only, with a true scope of the disclosure being indicated by the following claims.

What is claimed is:

1. A method for making a gas diffusion layer for an electrode, the method comprising:
processing quartz wool with water in a blender to form a suspension;
filtering the suspension to remove the water, to form a cake of entangled quartz fibers;
annealing the cake of the entangled quartz fibers without complete melting of the entangled quartz fibers to obtain a porous quartz felt having a pore size greater than 1 µm, the annealing being at 1250° C. to 1350° C. with an annealing plateau time of 5 minutes to 3 hours; and
coating the porous quartz felt with a conductive material.

2. The method according to claim 1, wherein the porous quartz felt has a transmittance equal to or greater than 30%, at wavelength between 400 and 800 nm, and the conductive material is a transparent conductive material.

3. The method according to claim 1, wherein the cake of entangled quartz fibers is pressed before annealing.

4. The method according to claim 1, wherein the porous quartz felt has a reflectance equal to or greater than 20%, at wavelength between 400 and 800 nm and for a resistivity equal to or less than 100 Ω/sq.

5. The method according to claim 1, wherein the quartz wool has a fiber diameter equal to or greater than 1 µm and equal to or smaller than 15 µm.

6. The method according to claim 1, wherein the entangled quartz fibers have an average length equal to or greater than 50 microns and equal to or smaller than 5 millimeters.

7. The method according to claim 1, wherein a porosity of the porous quartz felt is equal to or greater than 10% and equal to or smaller than 90%.

8. A gas diffusion layer for an electrode comprising partially melted entangled quartz fibers formed by annealing entangled quartz fibers at 1250° C. to 1350° C. with an annealing plateau time of 5 minutes to 3 hours, the partially melted entangled quartz fibers having a pore size greater than 1 µm, and a conductive material coated on the partially melted entangled quartz fibers.

9. The gas diffusion layer according to claim 8, wherein the gas diffusion layer has a transmittance equal to or greater than 15% at wavelengths between 400 nm and 800 nm.

10. The gas diffusion layer according to claim 8, wherein the gas diffusion layer has a sheet resistance equal to or smaller than 40 Ω/sq.

11. The gas diffusion layer according to claim 8, wherein a porosity of the gas diffusion layer is equal to or greater than 10% and equal to or smaller than 90%.

12. The gas diffusion layer according to claim 8, wherein the conductive material is fluorine doped tin oxide.

13. The gas diffusion layer according to claim 8, wherein the conductive material includes zinc oxide or silver nanowires.

14. A photoelectrode comprising the gas diffusion layer according to claim 8.

* * * * *